United States Patent [19]

Corbett et al.

[11] Patent Number: 4,468,365

[45] Date of Patent: Aug. 28, 1984

[54] EXTRUSION DIES FOR THIN WALL SUBSTRATES

[75] Inventors: Daniel W. Corbett, Lindley; George M. Cunningham, Horseheads; Louis S. Socha, Jr., Painted Post, all of N.Y.

[73] Assignee: Corning Glass Works, Corning, N.Y.

[21] Appl. No.: 409,402

[22] Filed: Aug. 19, 1982

[51] Int. Cl.³ .............................................. B29F 3/04
[52] U.S. Cl. .......................... 264/177 R; 264/209.1; 264/209.8; 425/192 R; 425/198; 425/376 A; 425/381; 425/461; 425/463; 425/466; 425/467
[58] Field of Search ............ 264/177 R, 209.1, 209.8; 425/381, 376 A, 461–467, 197–199, 192 R

[56] References Cited

U.S. PATENT DOCUMENTS

| | | | |
|---|---|---|---|
| 2,221,334 | 11/1940 | Tanzi | 425/199 |
| 2,677,335 | 5/1954 | Maldari | 425/464 |
| 3,905,743 | 9/1975 | Bagley | 425/464 |
| 3,923,444 | 12/1975 | Esper | 425/461 |
| 3,983,283 | 9/1976 | Bagley | 264/177 R |
| 4,118,456 | 10/1978 | Blanding et al. | 264/177 R |
| 4,168,944 | 9/1979 | Morikawa et al. | 264/209.1 |
| 4,243,370 | 1/1981 | Higuchi et al. | 425/467 |
| 4,298,564 | 11/1981 | Higuchi et al. | 264/177 R |
| 4,343,604 | 8/1982 | Minjolle | 264/177 R |
| 4,364,888 | 12/1982 | Levin | 264/209.8 |

FOREIGN PATENT DOCUMENTS 56-49242  5/1981  Japan .................................. 425/461

Primary Examiner—Jeffery R. Thurlow
Attorney, Agent, or Firm—B. R. Turner

[57] ABSTRACT

Method and apparatus is set forth for extruding honeycomb structures having cohesive cellular walls from an extrusion die. Deflector means are provided within flow passageways of the die, wherein the deflector means has a secondary feed system such that the batch flow from the main feed system is broken up into a multi-channel stream system which improves the flow of the batch material into the discharge slots, thus improving product quality and knitting or cohesiveness of the material prior to discharge from the die.

9 Claims, 4 Drawing Figures

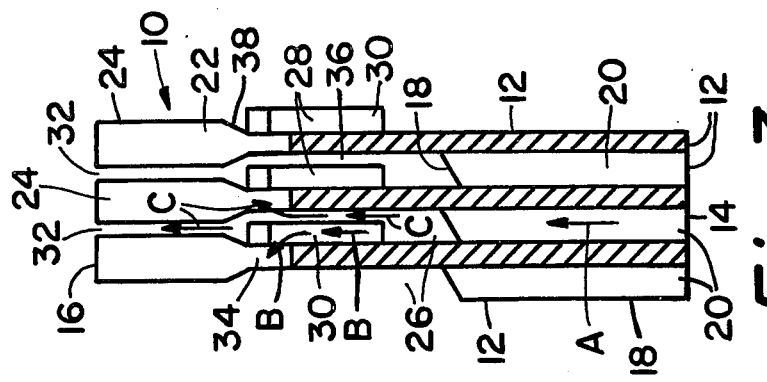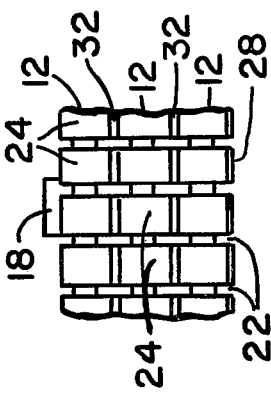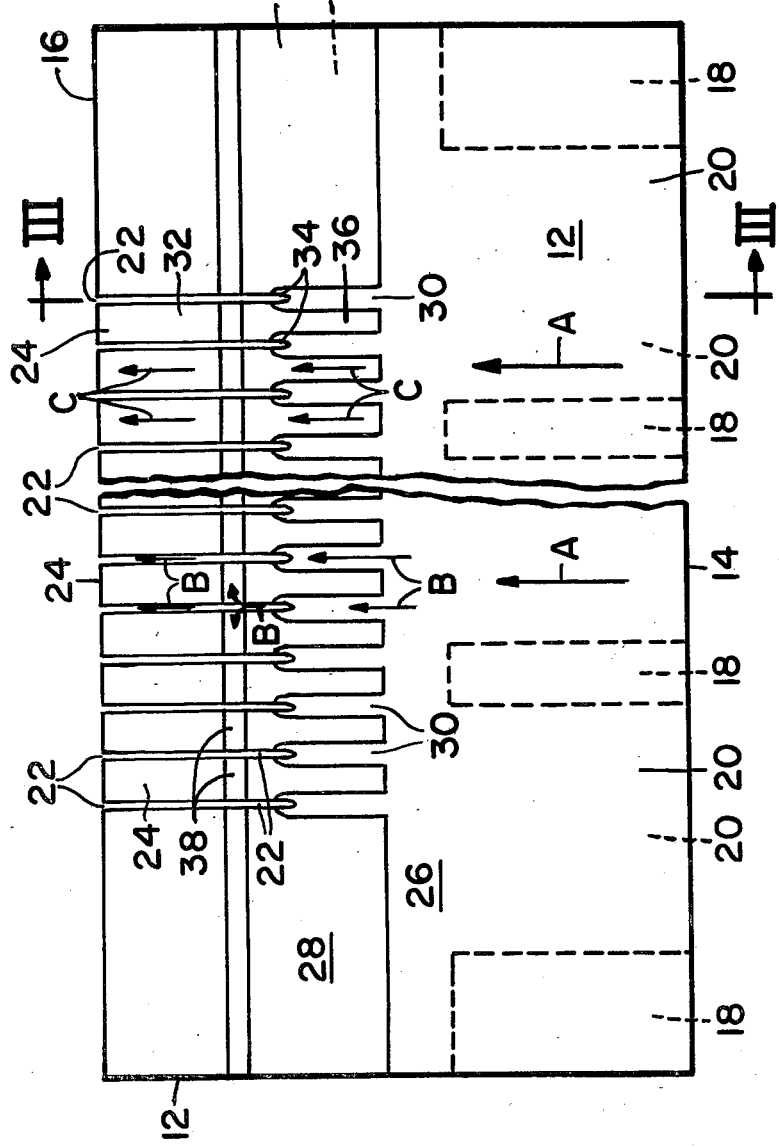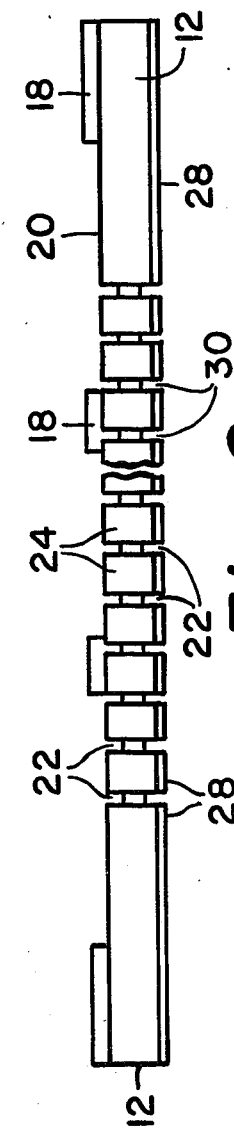

EXTRUSION DIES FOR THIN WALL SUBSTRATES

BACKGROUND OF THE INVENTION

Extrusion dies have been found to be useful in forming cellular or honeycomb ceramic substrates for use in catalytic converters utilized in the exhaust system of internal combustion engines. In order for such converters to function efficiently, it is necessary that the cells provide a substantially large surface area for catalytic material to react with the exhaust gases, and that the cell walls have a substantially thin cross-sectional dimension so as to provide a substantially large open frontal area and thereby reduce back pressure within the exhaust system. However, the thin walled structure must have sufficient mechanical and thermal integrity so as to withstand normal automotive impact and thermal requirements.

In order to provide increased surface area within the honeycomb structure so as to enhance catalytic activity, the number of cells has been increased from about 175 per sq. in. to 400 to more cells per sq. in., whereas the wall thickness between the cells has been reduced from about 10 mils to 6 mils or less. Accordingly, since the present invention is directed toward the extrusion of honeycomb structures having up to about 600 cells per sq. in. with a wall thickness of down to about 4 mils, the manufacture of the extrusion dies necessary for producing such honeycomb structures has required a variety of technological advances.

As pointed out in U.S. Pat. No. 3,905,743, extrusion dies may be formed in unitary die blocks by utilizing conventional machining and cutting techniques, electric discharge machining, or chemical machining. In addition, a plurality of machined or cut stacked plates are disclosed in such patent for forming laminated dies useful in extruding honeycomb structures. Further, U.S. Pat. No. 3,923,444 discloses a laminated extrusion die for forming honeycomb structures wherein a plurality of elongated extrusion plates are stacked upon one another and clamped together to form an extrusion die. However, it has been found that when forming honeycomb structures having a wall thickness of about 0.006" or less with the use of laminated die plates, the batch material had a tendency to flow longitudinally through the die with insufficient lateral flow to produce good knitting of the interconnected cellular walls of the substrate. In other words, the discharge slots which are formed longitudinally between the laminated plates have a tendency to function as a continuation of the feed slots with adequate flow, whereas the discharge slots formed transversely across such plates do not receive sufficient flow of the batch material to form complete knitting and provide a continuous cellular mass prior to being discharged from such slots.

The present invention has overcome the batch flow problems encountered with laminated dies when forming cellular substrates having relatively thin wall thicknesses of about 0.006" and below, by deflecting a portion of the longitudinal through flow of the batch within the die laterally or transversely within the slots formed within the plates per se, so as to form a continuous cellular mass within the die before being discharged longitudinally therefrom to produce a good knitted substrate.

SUMMARY OF THE INVENTION

In its simplest form, the present invention is directed to an improved extrusion die structure for forming thin-walled cellular or honeycomb structures and to a method of flowing the batch material through the die so as to produce a substrate with completely knitted or continuous cellular walls. Each of the laminated extrusion plates or die blades is provided with deflector means, adjacent the discharge slots of the assembled die, for deflecting at least a portion of the batch material, flowing longitudinally through the die from the feed channels, laterally of the laminated die so as to fill the discharge slots extending transversely across each of the adjacent extrusion plates or die blades forming the laminated die. Accordingly, the flow of batch material is distributed to all of the discharge slots, extending both transversely across and longitudinally between the extrusion plates or die blades, so as to form an interconnected cellular mass within the die body prior to being discharged therefrom, so as to provide an extruded substrate having completely knitted or continuous cellular walls.

It thus has been an object of the present invention to provide a novel, relatively easily manufacturable extrusion die for forming thin-walled honeycomb articles having relatively thin cellular walls which are continuous along their extent.

BRIEF DESCRIPTION OF THE DRAWINGS

FIG. 1 is a somewhat schematic elevational view of an extrusion plate or die blade of the present invention.

FIG. 2 is a plan view of the die blade shown in FIG. 1.

FIG. 3 is a somewhat schematic fragmental elevational view in section of a die formed of a stacked series of plates or blades shown in FIG. 1, such as taken along line III—III of FIG. 1.

FIG. 4 is a fragmental plan view of the outlet face of the die shown in FIG. 3.

DESCRIPTION OF THE PREFERRED EMBODIMENTS

A fragmented portion of a laminated extrusion die 10 is shown in FIG. 3, comprising a plurality of extrusion plates or die blades 12, which may be suitably clamped or fused together to form the laminated die. The die 10 has an inlet face 14 and a discharge or outlet face 16. Each of the extrusion plates or die blades 12, forming the laminated extrusion die 10, has a plurality of longitudinally extending ribs or channel dividers 18 extending from their inlet face 14 toward the outlet face 16, terminating intermediate such faces, and forming a plurality of primary feed channels 20 therebetween. The discharge or outlet face 16 of each of the die blades 12 is provided with a plurality of transverse discharge slots 22 extending across and longitudinally inwardly of the die blade from the outlet face 16 toward the inlet face 14. The transverse slots form a plurality of teeth or core pins 24 therebetween. A flow distribution area 26 is formed between the inner ends of the primary feed channels 20 and the inner ends of the transverse discharge slots 22 of each die blade 12, and is provided with a deflector member 28. Both the primary feed channels 20 and the transverse discharge slots 22 terminate adjacent to, and communicate with, the flow distribution area 26.

As shown more particularly in FIG. 3, the plane between each adjacent extrusion plate or die blade 12 forms a longitudinal discharge slot 32 between the teeth or core pins 24 formed in such adjacent die blades. The deflector member 28 is provided with a plurality of secondary feed channels 30, which communicate at one end adjacent an edge of member 28 with the primary feed channels 20 through flow distribution area 26, and at the other end inwardly of the deflector member 28 with inner end portions 34 of the transverse discharge slots 22. When viewing FIG. 3, it becomes apparent that without the utilization of the deflector member 28, having secondary feed channels 30, the flow of batch material entering the primary feed channels 20, as represented by arrow A, would have a tendency to continue a direct longitudinal through flow between adjacent die blades 12, from primary feed channel 20, through flow distribution area 26, and outwardly through the longitudinal discharge slots 32. The problem with such a through flow is that there is no tendency for the batch to flow transversely into transverse discharge slots 22, and thereby provide good knitting of the batch material prior to discharge from the outlet face 16 of the die 10.

However, as shown in both FIG. 1 and FIG. 2, with the utilization of the deflector member 28, the flow of batch material from the primary feed channels 20 is distributed within the flow distribution area 26 so as to flow into and along secondary feed channels 30, communicating with transverse discharge slots 22 as shown by arrows B, and along a deflector gap 36 between the deflector and an adjacent die blade, such that batch flow is provided in both the transverse discharge slots 22 and the longitudinal discharge slots 32 as shown by arrows C. Further, the tapered portions 38 at the inner ends of the teeth or core pins 24, communicating with the flow distribution area 26, facilitate the lateral or transverse flow, of the longitudinally through flowing batch material, into the transverse discharge slots 22 so as to facilitate the knitting or coalescing of the batch material into a honeycomb structure prior to being discharged from the die. That is, by positioning the deflector member 28, having secondary feed channels 30, within the flow distribution area 26, the longitudinal batch flow from the main or primary feed channels 20 is broken up into a multi-channel stream system as shown by arrows A, B, and C. The multi-channel stream system improves the flow of the batch material into the discharge slots 22, 32, thus facilitating the knitting of the batch material within the die and improving product quality.

When the individual extrusion plates or die blades 12 are stacked in parallel relationship as shown in FIG. 3 to form a laminated extrusion die 10, side edge portions of the blades are of course sealed, and the blades clamped or bonded together to form a unitary die such that the flow of the batch material enters the inlet face 14 and flows through the die, filling all of the discharge slots prior to being discharged from the outlet face 16. In view of the fact that the impedance of the die is the amount of resistance which the die has to fluid flow, and the fact that impedance of the die should be so adjusted such that the longitudinal flow in the feed channels is impeded sufficiently between adjacent parallel extrusion plates so as to facilitate transverse flow into discharge slots 22, the use of deflector members 28 greatly effects the impedance between the plates so as to facilitate the necessary filling of the transverse discharge slots 22 as well as the longitudinal discharge slots 32 between the adjacent plates.

As a specific example, but by no means limiting in nature, a laminated extrusion die was formed containing 40 die blades which were about 4½" long side edge-to-side edge, 1½" between inlet and outlet faces, and about 0.05" thick including the ribs or channel dividers which were slightly less than about 0.03". A deflector member having a length equal to the length of the die blade, a thickness of about 0.02" and an inlet-to-outlet extent of about 0.15" was brazed to one side of each die blade, with the exception of an outer blade, within the flow distribution area of each such blade. A plurality of 83 slots having a width of 0.010" were cut into the deflector member on 0.049" centers from an inlet end thereof for a distance of about 0.125" prior to being brazed to the die blades. Then, 83 transverse discharge slots having a width of 0.0035" were cut into the discharge face of the die blade a distance of about 0.2" so as to intersect the 0.01" slots formed in the deflector member. Edge portions of the various plates were then sealed and the plates clamped together to form a laminated die having transverse and longitudinal discharge slots both equal to about 0.0035".

Although the now preferred embodiments of our invention have been disclosed, it will be apparent to those skilled in the art that various changes and modifications may be made thereto without departing from the spirit and scope thereof as defined in the appending claims.

We claim:

1. A laminated extrusion die for forming honeycomb structures which comprises, a plurality of die blades positioned adjacent one another in a substantially parallel relationship, means securing said plurality of substantially parallel die blades together for forming a unitary extrusion die, said die having an inlet face and an outlet face, a plurality of primary feed channels between said parallel die blades extending longitudinally inwardly from said inlet face, a plurality of interconnected discharge slots formed in said outlet face and extending longitudinally inwardly therefrom, a flow distribution area between adjacent ones of said die blades and communicating with said primary feed channels and said discharge slots, deflector means, having secondary feed channels, positioned within said flow distribution areas for deflecting at least a portion of the longitudinal flow of batch material to delivered to the said flow distribution areas by said primary feed channels, transversely of such longitudinal flow, and for filling all of said interconnected discharge slots with batch material so as to discharge a cohesive honeycomb structure from said die, and said secondary feed channels being formed in said deflector means and communicating at one end adjacent in edge of said deflector means with said primary feed channels and at the other end inwardly of said deflector means with certain of said discharge slots.

2. A laminated extrusion die for forming honeycomb structures as defined in claim 1 wherein said plurality of interconnected discharge slots includes a plurality of transverse discharge slots formed transversely across each of said die blades within a central portion of its longitudinal length and a plurality of longitudinal discharge slots formed longitudinally along and between adjacent ones of said plurality of die blades, said longitudinal slots and said transverse slots being of substantially identical width, and said transverse slots extending into a portion of said deflector means.

3. A laminated extrusion die for forming honeycomb structures as defined in claim 1 wherein said discharge slots include a plurality of longitudinal discharge slots extending longitudinally between adjacent die blades and transverse discharge slots formed transversely across aid die blades within central portions thereof, and said transverse discharge slots extending inwardly within said deflector means and terminating at a juncture with said secondary feed channels.

4. A laminated extrusion die for forming honeycomb structures as defined in claim 1 including a plurality of channel divides for forming said primary feed channels and spacing said adjacent die blades a predetermined distance apart, said deflector means having a thickness which is less than that of said channel dividers so as to provide a deflector gap between said deflector means and an adjacent die blade which communicates with both said primary feed channels and said discharge slots.

5. A laminated extrusion die for forming honeycomb structures as defined in claim 1 wherein said plurality of interconnected discharge slots includes a plurality of transverse discharge slots formed across each of said die blades and a plurality of longitudinal discharge slots formed between adjacent die blades, said secondary feed channels communicating directly with said transverse discharge slots and a deflector gap formed between each said deflector means and an adjacent die blade communicating directly with a longitudinal discharge slot and said primary feed channels.

6. A laminated extrusion die for forming honeycomb structures as defined in claim 1 including a flow detector means positioned within each of said flow distribution areas having a thickness which is less than the thickness of such flow distribution area between adjacent ones of said die blades, a flow gap formed between each said deflector means and an adjacent die blade, and said flow gap and said secondary feed channels both communicating with said primary feed channels and said discharge slots.

7. A laminated extrusion die for foming honeycomb structures as defined in claim 6 wherein said plurality of interconnected discharge slots includes a plurality of transverse slots extending across each of said die blades and a plurality of longitudinal slots extending between adjacent die blades, said transverse discharge slots extending into said deflector means and terminating at a junction with said secondary feed channels.

8. A laminated extrusion die for forming honeycomb structures which comprises, a plurality of die blades positioned adjacent one another and secured together so as to form a laminated extrusion die, means for maintaining portions of adjacent die blades in predetermined spaced apart relationship for forming flow passageways for batch material between said adjacent blades, deflector means positioned within said flow passageways for deflecting at least a portion of longitudinal flow of batch material through said flow passageways transversely of such longitudinal flow prior to discharge from said extrusion die, an open ended flow gap extending longitudinally between each deflector means and an adjacent blade, a plurality of feed passageways formed in said deflector means communicating with said flow passageways and in open communication with said flow gap, a plurality of interconnecting discharge slots communicating with one end of said flow passageways, and a plurality of primary feed channels forming an opposite end of said flow passageways, said flow gap communicating at one open end with said primary feed channels and at an opposite open end with said discharge slots to form a longitudinal flow path through said die, and said feed passageways in said deflector means communicating between said primary feed channels and said discharge slots to form a transverse flow path within said die.

9. A method of forming a honeycomb structure from extrudable batch material which comprises, initially flowing such batch material into and longitudinally along a plurality of primary feed channels within a die structure, flowing such batch material from said primary feed channels simultaneously into and longitudinally along a plurality of secondary feed channels and through a gap adjacent said secondary feed channels, dividing the longitudinal flow of batch material from said primary feed channels into a plurality of smaller spaced-apart secondary flows within such secondary feed channels, deflecting a portion of the longitudinal flow of batch material from said secondary feed channels transversely of such longitudinal flow and filling transversely oriented discharge slots with such flow of batch material while simultaneously filling longitudinally oriented discharge slots with batch material flowing along said gap, maintaining communication between the flows within said secondary feed channels and the flow through said gap adjacent said channels, and discharging a cohesive honeycomb structure from said die.

* * * * *

UNITED STATES PATENT AND TRADEMARK OFFICE
CERTIFICATE OF CORRECTION

PATENT NO. : 4,468,365
DATED : August 28, 1984
INVENTOR(S) : Daniel W. Corbett, George M. Cunningham and Louis Socha It is certified that error appears in the above-identified patent and that said Letters Patent is hereby corrected as shown below:

Column 1, line 24 "400 to more" should read --400 or more--.

Column 4, line 60, "in" should read --an--.

Column 5, line 12, "aid" should read --said--.

Column 5, line 34, after "slots" insert --,--.

Column 5, lines 39 and 40, "detector" should read --deflector--.

Column 5, line 56, "junction" should read --juncture--.

Signed and Sealed this

Twenty-sixth Day of February 1985

[SEAL]

Attest:

DONALD J. QUIGG

Attesting Officer  Acting Commissioner of Patents and Trademarks